(12) United States Patent
Huang et al.

(10) Patent No.: US 10,523,303 B2
(45) Date of Patent: Dec. 31, 2019

(54) METHOD AND APPARATUS FOR TRANSMITTING SIGNAL IN WIRELESS COMMUNICATIONS SYSTEM

(71) Applicant: HUAWEI TECHNOLOGIES CO., LTD., Shenzhen (CN)

(72) Inventors: Huang Huang, Chengdu (CN); Wenxian Jiang, Shenzhen (CN); Sainan Li, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/154,692

(22) Filed: Oct. 8, 2018

(65) Prior Publication Data

US 2019/0044604 A1 Feb. 7, 2019

Related U.S. Application Data

(63) Continuation of application No. PCT/CN2017/075968, filed on Mar. 8, 2017.

(30) Foreign Application Priority Data

Apr. 8, 2016 (CN) .......................... 2016 1 0220210

(51) Int. Cl.
*H04B 7/08* (2006.01)
*H04B 7/06* (2006.01)
(Continued)

(52) U.S. Cl.
CPC .............. *H04B 7/0811* (2013.01); *H04B 7/04* (2013.01); *H04B 7/0408* (2013.01); *H04B 7/06* (2013.01);
(Continued)

(58) Field of Classification Search
CPC ...... H04B 7/0811; H04B 7/04; H04B 7/0408; H04B 7/06; H04B 7/0602; H04B 7/0695; H04B 7/088
See application file for complete search history.

(56) References Cited

U.S. PATENT DOCUMENTS 6,665,334 B1 * 12/2003 Wichman ............. H04B 1/7107
375/148
2010/0130223 A1 5/2010 Liao et al.
(Continued)

FOREIGN PATENT DOCUMENTS

CN 101507342 A 8/2009
CN 101584163 A 11/2009
(Continued)

OTHER PUBLICATIONS

Huawei,"DL Coordinated Beam Switching for Interference management in LTE-Advanced",3GPP TSG RAN WG1#54bis R1-083710,Prague, Czech Republic, Sep. 29-Oct. 3, 2008,total 8 pages.

*Primary Examiner* — Sophia Vlahos
(74) *Attorney, Agent, or Firm* — Kilpatrick Townsend & Stockton LLP

(57) ABSTRACT

This application discloses a method and an apparatus for transmitting a signal in a wireless communications system. The method includes: sending or receiving a signal of a first beam in a first beam set within a communication time of the first beam; and sending or receiving a signal of a third beam in a second beam set within a switching gap for switching from the first beam to a second beam in the first beam set. According to the method and the apparatus for transmitting a signal in a wireless communications system in embodiments of this application, overheads can be reduced.

14 Claims, 10 Drawing Sheets

First beam set

Second beam set

(51) Int. Cl.
    *H04B 7/04*      (2017.01)
    *H04B 7/0408*    (2017.01)
(52) U.S. Cl.
    CPC ......... *H04B 7/0602* (2013.01); *H04B 7/0695*
                   (2013.01); *H04B 7/088* (2013.01)

(56)         References Cited

U.S. PATENT DOCUMENTS

2011/0038355 A1    2/2011  Chou
2014/0055302 A1*   2/2014  Jia ........................... H01Q 3/34
                                                        342/372
2014/0254452 A1*   9/2014  Golitschek Edler Von
                           Elbwart ............ H04W 52/0216
                                                        370/311
2017/0201304 A1    7/2017  Kim
2017/0273058 A1*   9/2017  Agiwal ................. H04W 16/28
2018/0219597 A1*   8/2018  Irie ........................ H04B 7/10
2018/0302137 A1*  10/2018  Maltsev ............... H04B 7/0695

FOREIGN PATENT DOCUMENTS

CN          103748801 A    4/2014
EP            2887560 A1   6/2015
WO         2016022235 A1   2/2016

* cited by examiner

200

METHOD AND APPARATUS FOR TRANSMITTING SIGNAL IN WIRELESS COMMUNICATIONS SYSTEM

CROSS-REFERENCE TO RELATED APPLICATIONS

This application is a continuation of International Application No. PCT/CN2017/075968, filed on Mar. 8, 2017, which claims priority to Chinese Patent Application No. 201610220210.0, filed on Apr. 8, 2016, The disclosures of the aforementioned applications are hereby incorporated by reference in their entireties.

TECHNICAL FIELD

This application relates to the communications field, and more specifically, to a method and an apparatus for transmitting a signal in a wireless communications system.

BACKGROUND

Conventional operating frequency bands of a mobile communications system are mainly frequency bands below 3 GHz. As a result, spectrum resources are very limited. To implement ultrafast short-range communication and support 5G requirements for a capacity, a transmission rate, and the like, a signal is transmitted in the mobile communications system by using a high frequency band, to mitigate current shortage of spectrum resources. To overcome a native disadvantage, that is, a high path loss, of the high frequency band, a high-gain narrow-beam antenna needs to be used at a physical layer to improve link coverage. Beam scanning is inevitable in high-frequency communication. In the beam scanning, excitation phases of array elements are changed by using a method for controlling a phase shift amount of a phase shifter, so as to implement the beam scanning.

In a beam scanning process in the prior art, a switching gap is reserved for each beam switching time, and no signal is sent in a time period of the switching gap, thereby wasting overheads.

SUMMARY

This application provides a method and an apparatus for transmitting a signal in a wireless communications system, to reduce overheads.

According to a first aspect, a method for transmitting a signal in a wireless communications system is provided, including:

sending or receiving a signal of a first beam in a first beam set within a communication time of the first beam; and sending or receiving a signal of a third beam in a second beam set within a switching gap for switching from the first beam to a second beam in the first beam set.

According to the method for transmitting a signal in a wireless communications system in this embodiment of this application, the signal of the third beam in the second beam set is sent or received within the switching gap for switching from the first beam to the second beam in the first beam set, to reduce overheads.

When the switching gap for switching from the first beam to the second beam in the first beam set is sufficiently large, beams in a plurality of beam sets may be transmitted within the switching gap. For example, within a switching gap of a beam in one of three beam sets, signals of beams in the other two beam sets may be sent or received.

In some possible implementations, the first beam set and the second beam set are corresponding to different user equipments UEs.

When the first beam set and the second beam set are corresponding to different user equipments UEs, a base station schedules sending or receiving for the first beam set and the second beam set, to ensure that a signal of a beam of UE is sent or received within a beam switching gap of another UE. For example, in uplink multi-user beam training, a plurality of users send beams to the base station. In other words, the method for transmitting a signal in a wireless communications system in this embodiment of this application can be applied to an uplink multi-user beam training scenario.

In some possible implementations, the first beam set and the second beam set are corresponding to different antenna ports, or corresponding to different antennas of a same antenna port.

When one antenna port is corresponding to a plurality of antennas, the first beam set and the second beam set are corresponding to different antennas of the antenna port; or when one antenna port is corresponding to one antenna, the first beam set and the second beam set are corresponding to different antenna ports. In these cases, this application is also applicable. In other words, the method for transmitting a signal in a wireless communications system in this embodiment of this application can be applied to a scenario in which one antenna port is corresponding to one or more antennas.

In some possible implementations, the first beam set and the second beam set are corresponding to different identifier sets. Alternatively, in some possible implementations, the first beam set and the second beam set are corresponding to different identifiers, so that the base station or the UE distinguishes between different beam sets and/or beams. For example, the base station determines different beam sets and/or beams by using beam IDs.

With reference to the first aspect, in a first possible implementation of the first aspect, the method further includes:

sending or receiving a signal of a fourth beam in a third beam set within the communication time of the first beam in the first beam set; and sending or receiving a signal of a fifth beam in a fourth beam set within the switching gap for switching from the first beam to the second beam in the first beam set.

The method for transmitting a signal in a wireless communications system in this embodiment of this application can be applied to a scenario in which beam training is performed at a transmit end of the base station or the UE, and a scenario in which beam training is performed at a receive end of the base station or the UE; or can be applied to a scenario in which initial beam scanning is performed during alignment between the base station and the UE.

Optionally, in some implementations, a communication time of the fourth beam is the same as the communication time of the first beam, and a communication time of the fifth beam is the same as a communication time of the third beam.

In some possible implementations, the communication time of the first beam in the first beam set may be the same as the communication time of the fourth beam in the third beam set, and the communication time of the third beam in the second beam set may be the same as the communication time of the fifth beam in the fourth beam set. In other words, in some implementations, this application is also applicable when sending is simultaneously performed for a plurality of beam sets.

Optionally, in some implementations, a communication time of the fourth beam is different from the communication time of the first beam.

Herein, the communication time of the first beam in the first beam set may be the same as the communication time of the fourth beam in the third beam set, regardless of whether a communication time of the third beam in the second beam set is the same as a communication time of the fifth beam in the fourth beam set. This may also be implemented.

Optionally, in some implementations, a communication time of the fifth beam is different from a communication time of the third beam.

Herein, the communication time of the third beam in the second beam set may be the same as the communication time of the fifth beam in the fourth beam set, regardless of whether the communication time of the first beam in the first beam set is the same as a communication time of the fourth beam in the third beam set. This may also be implemented.

With reference to the first possible implementation of the first aspect, in a second possible implementation of the first aspect, the signal of the first beam and the signal of the fourth beam are sent in a frequency division or code division manner; and/or the signal of the third beam and the signal of the fifth beam are sent in the frequency division or code division manner.

For simultaneously sent signals of beams or signals, having a same communication time, of beams, signals of different beams can be distinguished by using frequencies and/or preambles. For example, the signal of the first beam and the signal of the fourth beam may be simultaneously sent by using different frequencies, and the signal of the third beam and the signal of the fifth beam may also be simultaneously sent by using different frequencies.

In addition, when beams in two beam sets, such as the first beam set and the second beam set, are sent or received, because the first beam set and the second beam set are separated regarding time, the first beam and the third beam may be sent by using a same codeword or frequency. Likewise, the fourth beam in the third beam set and the fifth beam in the fourth beam set may also be sent by using a same codeword or frequency.

In some possible implementations, the first beam set, the second beam set, the third beam set, and the fourth beam set are corresponding to different antenna ports, or corresponding to different antennas of a same antenna port.

Herein, the first beam set, the second beam set, the third beam set, and the fourth beam set are also applicable to a case in which beam sets are corresponding to different antenna ports, or beam sets are corresponding to different antennas of a same antenna port.

In some possible implementations, the first beam set, the second beam set, the third beam set, and the fourth beam set are corresponding to different user equipments UEs.

If there are more beam sets in a communications system and the beam sets are corresponding to different UEs, the method for transmitting a signal in a wireless communications system in this embodiment of this application can also be applied to an uplink multi-user beam training scenario.

In some possible implementations, the first beam set, the second beam set, the third beam set, and the fourth beam set are corresponding to different identifier sets.

In some possible implementations, both the first beam set and the third beam set are corresponding to a first identifier set, and both the second beam set and the fourth beam set are corresponding to a second identifier set.

For a plurality of beam sets, the base station or the UE can also determine different beam sets or beams by using beam identifiers.

According to a second aspect, an apparatus for transmitting a signal in a wireless communications system is provided, and is configured to perform the method in any one of the first aspect or the possible implementations of the first aspect. Specifically, the apparatus includes modules or units configured to perform the method in any one of the first aspect or the possible implementations of the first aspect.

According to a third aspect, an apparatus for transmitting a signal in a wireless communications system is provided. The apparatus includes a processor, a memory, and a communications interface. The processor is connected to the memory and the communications interface. The memory is configured to store an instruction, and the processor is configured to execute the instruction. The communications interface is configured to communicate, under control of the processor, with another network element. When the processor executes the instruction stored in the memory, the execution enables the processor to perform the method in any one of the first aspect or the possible implementations of the first aspect.

According to a fourth aspect, a computer-readable medium is provided, and is configured to store a computer program. The computer program includes an instruction used to perform the method in any one of the first aspect or the possible implementations of the first aspect.

DESCRIPTION OF EMBODIMENTS

The following describes technical solutions in embodiments of this application with reference to accompanying drawings.

Figure 1:
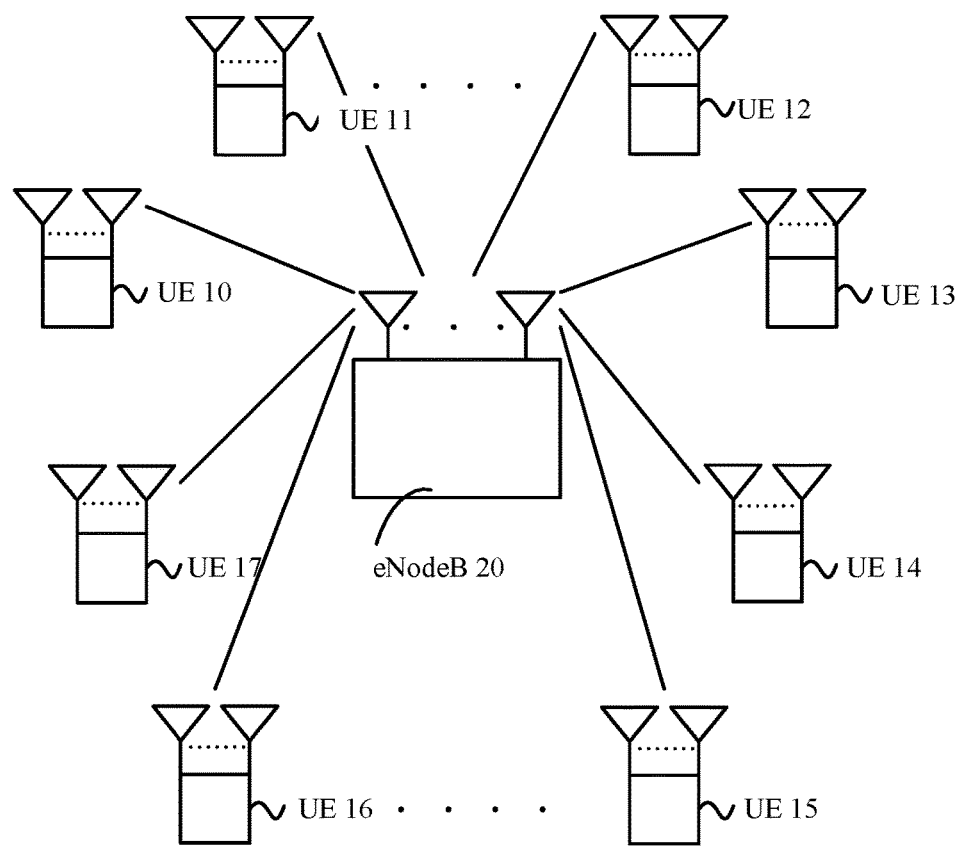
FIG. 1 is a schematic architectural diagram of an application scenario according to an embodiment of this application.

The technical solutions of this application may be applied to a high-frequency wireless communications system. The high-frequency wireless communications system uses high-band spectrum resources, and can implement ultrafast short-range communication and support 5G requirements for a capacity, a transmission rate, and the like. For example, a 5G communications system uses a high frequency band above 6 GHz for communication on a cellular access network. FIG. 1 is a schematic architectural diagram of an application scenario according to an embodiment of this application. As shown in FIG. 1, for example, a basic network architecture of the high-frequency wireless communications system may include a base station (eNodeB) 20 and at least one wireless terminal, such as user equipments (UE, User Equipment): UE 10, UE 11, UE 12, UE 13, UE 14, UE 15, UE 16, and UE 17. As shown in FIG. 1, the eNodeB 20 is configured to provide a communication service for at least one wireless terminal among the UE 10 to the UE 17, and access a core network. Any wireless terminal among the UE 10 to the UE 17, as well as the eNodeB 20, may include at least one antenna. FIG. 1 is described by using a plurality of antennas as an example. The plurality of antennas may be corresponding to a same antenna port, or one antenna is corresponding to one antenna port. A communication signal between the any wireless terminal and the eNodeB 20 in FIG. 1 needs to be transmitted by using the antenna. For example, the base station and the UE may send or receive signals of a plurality of beams by using their respective antennas. In a communication process in the high-frequency wireless communications system, to overcome a high path loss of a high frequency band, a high-gain narrow-beam antenna needs to be used at a physical layer to improve coverage of a communications link. In this process, beam switching may need to be performed for the antenna. For example, an antenna array includes N antenna array elements. Each antenna array element is corresponding to one phase value (for example, a group of phase values corresponding to the N antenna array elements are $\varphi_1, \varphi_2, \ldots, \varphi_N$, and different beams may be obtained by changing $\varphi_1, \varphi_2, \ldots, \varphi_N$, that is, each group of phase values is corresponding to one beam). In a process of beam scanning by an antenna, each group of phase values of the N antenna array elements is corresponding to one beam, for example, a beam 1, a beam 2, a beam 3, and the like. Beam switching means switching from the beam 1 to the beam 2, switching from the beam 2 to the beam 3, and so on. During beam switching for each beam, a switching gap (Gap) is reserved between beams. However, in the prior art, no signal is sent within a switching gap of a beam, thereby inevitably wasting overheads. For this problem, the embodiments of this application provide a method for transmitting a signal in a wireless communications system. The following provides detailed descriptions.

The base station 20 in FIG. 1 may be a base station in the high-frequency wireless communications system, or a communications device supporting the high-frequency wireless communications system. This is not limited in this application.

The UE in FIG. 1, also referred to as a mobile terminal (Mobile Terminal), mobile user equipment, and the like, may communicate with one or more core networks through a radio access network (for example, RAN, Radio Access Network). The user equipment may be a mobile terminal, such as a mobile phone (or referred to as a "cellular" phone) or a computer with a mobile terminal. For example, the user equipment may be a portable, pocket-sized, handheld, computer built-in, or in-vehicle mobile apparatus, which exchanges voice and/or data with the radio access network.

The method for transmitting a signal in a wireless communications system in the embodiments of this application may be applied to different scenarios in which UE and a base station communicate with each other in a high-frequency wireless communications system. In other words, the method in the embodiments of this application may be applied to different scenarios related to beam switching. For example, the method may be applied to a scenario in which the base station 20 in FIG. 1 performs initial beam scanning (a scenario in which the base station is aligned with the UE so that the UE is synchronized with the base station), or a scenario in which synchronization and beam training (including receiving or sending) are performed between the base station 20 and any UE (if training is transmit beam training of the base station, the UE performs receiving; or if training is transmit beam training of the UE, the base station performs receiving), or a scenario in which a plurality of UEs simultaneously send beams to the base station (that is, uplink multi-user beam training).

In various embodiments among the embodiments of this application, a beam set is a set of a series of beams that is formed during beam switching, for example, switching from a beam 1 to a beam 2, switching from the beam 2 to a beam 3, and so on, until switching to a beam n; then the beam set may include the beam 1, the beam 2, . . . , and the beam n. In other words, a beam set described below may be understood as a plurality of beams in a beam switching process. Certainly, the beam set herein is not limited to a scenario in which the beam set can be only a plurality of beams in a beam switching process, and may also be a beam set in any other proper scenario.

Figure 2:
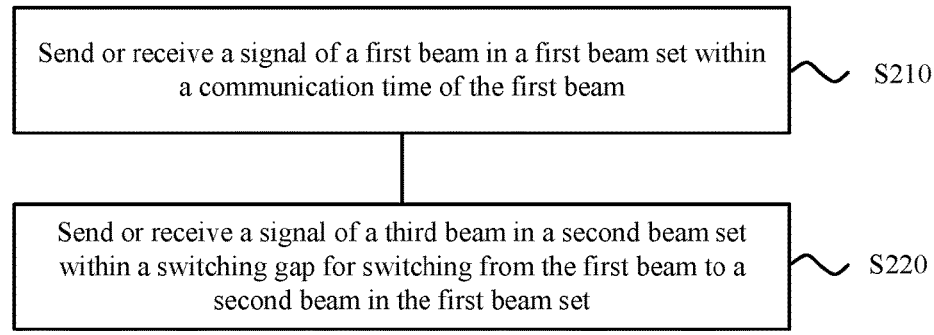
FIG. 2 is a schematic flowchart of a method for transmitting a signal in a wireless communications system according to an embodiment of this application.

FIG. 2 is a schematic flowchart of a method 200 for transmitting a signal in a wireless communications system according to an embodiment of this application. The method 200 includes the following steps:

S210. Send or receive a signal of a first beam in a first beam set within a communication time of the first beam.

S220. Send or receive a signal of a third beam in a second beam set within a switching gap for switching from the first beam to a second beam in the first beam set.

Specifically, a base station sends or receives the signal of the first beam in the first beam set within the communication time of the first beam; and then sends or receives the signal of the third beam in the second beam set within the switching gap for switching from the first beam to the second beam in the first beam set. In other words, switching gaps of beams in the first beam set and the second beam set are staggered, and a signal of a beam in a beam set is transmitted within a switching gap of a beam in the other beam set. A signal of the first beam set is transmitted within a switching gap of the second beam set, and a signal of the second beam set is transmitted within a switching gap of the first beam set. This can reduce overheads. In addition, because signals of beams in beam sets are sent in a staggered manner, interference between cells corresponding to the beam sets can also be reduced.

In this embodiment of this application, the first beam set may be a beam 1, a beam 2, . . . , and a beam n in a beam switching process of a first antenna port or antenna; the second beam set may be a beam 1, a beam 2, . . . , and a beam n in a beam switching process of another antenna port or antenna; and so on.

It should be understood that herein, the first beam and the second beam are used to represent different beams in the first beam set, and the third beam is used to represent a beam in the second beam set, merely for distinguishing between or representing different beams, but not for limiting content of a beam set.

According to the method for transmitting a signal in a wireless communications system in this embodiment of this application, the signal of the third beam in the second beam set is sent or received within the switching gap for switching from the first beam to the second beam in the first beam set, to reduce overheads.

Optionally, in this embodiment of this application, the first beam set and the second beam set may be corresponding to different identifier sets. For example, beam identifiers (ID) of beams in the first beam set form an identifier set, or beams in the first beam set use a same identifier; and beam identifiers (ID) of beams in the second beam set form another identifier set, or beams in the second beam set use a same identifier, to determine or distinguish between different beam sets or beams. Herein, the beam identifiers may be IDs preconfigured in the system, to distinguish between different beam sets. For example, the system configures different IDs for antenna ports (or beam sets). Optionally, the system may configure different IDs for beams at an antenna port, or may determine a sequence of beams in a beam set based on IDs.

In this embodiment of this application, the communications system may include a plurality of beam sets. A signal of a beam in one of the plurality of beam sets is sent or received within a switching gap of a beam in another beam set. This can implement staggered sending or receiving of signals, thereby avoiding mutual interference and improving system efficiency.

It should be understood that this embodiment of this application is described by using the first beam set and the second beam set as examples, but this should not constitute a limitation on this embodiment of this application.

Figure 3:
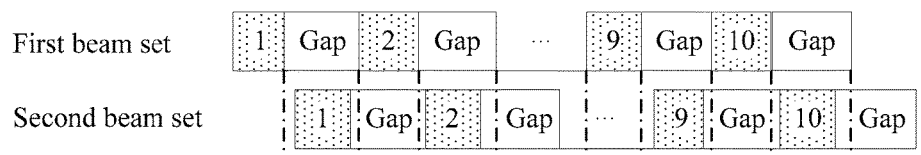
FIG. 3 is a schematic diagram of an example according to an embodiment of this application.
Figure 4:
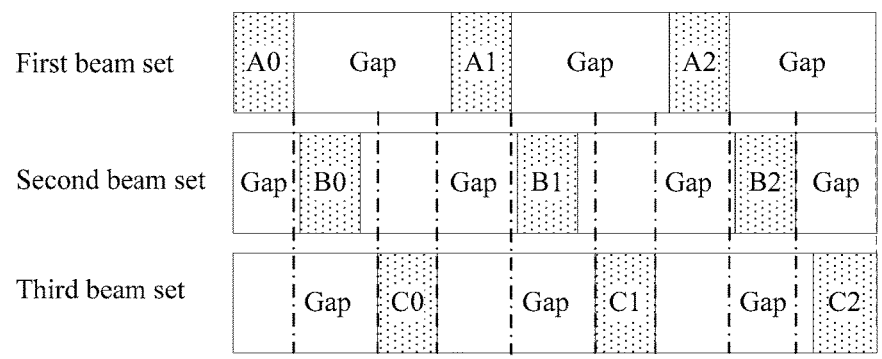
FIG. 4 is a schematic diagram of another example according to an embodiment of this application.

The following describes the method for transmitting a signal in a wireless communications system in this embodiment of this application with reference to FIG. 3 and FIG. 4.

For example, FIG. 3 is a schematic diagram of an example according to an embodiment of this application. It should be noted that this is merely intended to help a person skilled in the art better understand this embodiment of this application, but not to limit the scope of this embodiment of this application. As shown in FIG. 3, the first beam set and the second beam set each include 10 different beams: a beam 1, a beam 2, . . . , and a beam 10; ▨ is used to represent a communication time of a signal of a beam; and □ is used to represent a switching gap Gap of a signal of a beam. A signal of a beam 1 in the first beam set is sent or received within a communication time of the beam 1; a signal of a beam 1 in the second beam set is sent or received within a switching gap for switching from the beam 1 in the first beam set to a beam 2 in the first beam set; and so on. In other words, a signal of the first beam set is transmitted within a beam switching gap of the second beam set, and a signal of the second beam set is transmitted within a beam switching gap of the first beam set, thereby reducing overheads and inter-cell interference. In addition, signals of the first beam set and the second beam set may be sent simultaneously. Compared with separate sending for the first beam set and the second beam set, this improves system efficiency.

For another example, FIG. 4 is a schematic diagram of another example according to an embodiment of this application. As shown in FIG. 4, a first beam set includes A0, A1, and A2; a second beam set includes B0, B1, and B2; a third beam set includes C0, C1, and C2; ▨ is used to represent a communication time of a signal of a beam; and □ is used to represent a switching gap Gap of a signal of a beam. Within a switching gap for switching from the beam A0 to the beam A1 in the first beam set, the beam B0 in the second beam set may be sent or received, and the beam C0 in the third beam set may also be sent or received; and so on. That is, within a switching gap of a beam in one of the three beam sets, signals of beams in the other two beam sets may be sent or received. In other words, if a switching gap is sufficiently large, more beams in other beam sets may be transmitted in the switching gap.

It should be understood that in this embodiment of this application, numbers "first", "second", and so on are merely intended to distinguish between different objects, for example, distinguish between different beam sets or beams, but do not constitute a limitation on the scope of this embodiment of this application, and this application is not limited thereto.

Therefore, according to the method for transmitting a signal in a wireless communications system in this embodiment of this application, the signal of the third beam in the second beam set is sent or received within the switching gap for switching from the first beam to the second beam in the first beam set, to reduce overheads.

Optionally, in an embodiment, the method for transmitting a signal in a wireless communications system in this embodiment of this application may be applied to a scenario in which a base station performs initial beam scanning, that is, a scenario in which a base station is aligned with UE so that the UE is synchronized with the base station. The following describes the method according to this embodiment of this application in this scenario with reference to FIG. 5 to FIG. 7.

Figure 5:
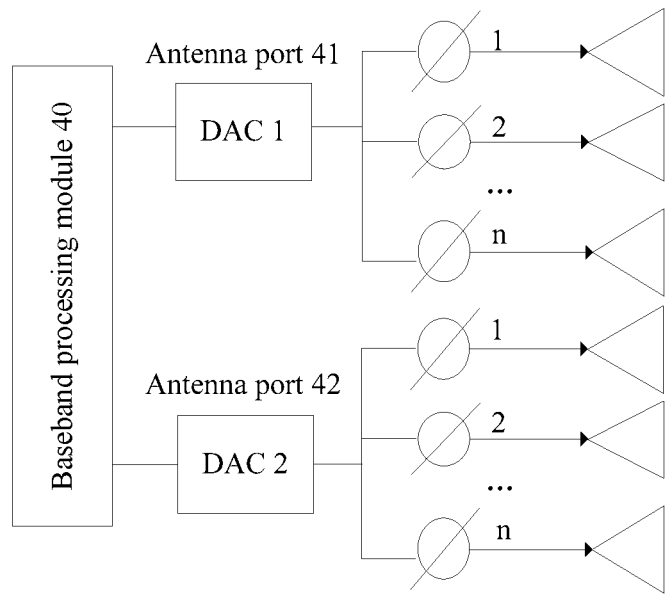
FIG. 5 is an antenna architecture diagram of a base station according to an embodiment of this application.

FIG. 5 is an antenna architecture diagram of a base station according to an embodiment of this application. The base station may be the base station 20 in FIG. 1. As shown in FIG. 5, a baseband processing module 40 of the base station includes two digital-to-analog converters (Digital to analog converter, "DAC" for short): a DAC 1 and a DAC 2, corresponding to two antenna ports 41 and 42. Each antenna port includes n antenna array elements (phase shifters). The n antenna array elements form a phased array antenna.

Figure 6:
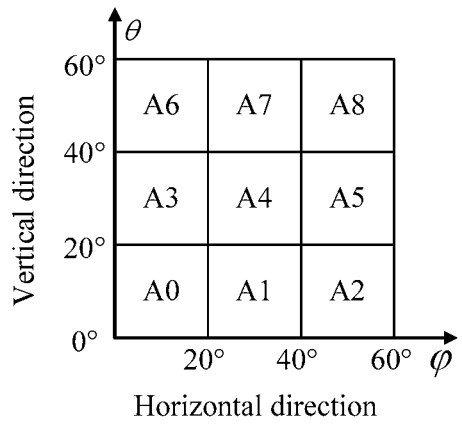
FIG. 6 is a schematic diagram of a beam scanning range of a base station according to an embodiment of this application.

FIG. 6 is a schematic diagram of a beam scanning range of a base station according to an embodiment of this application. As shown in FIG. 6, a horizontal coordinate represents an angle φ in a horizontal direction, a vertical coordinate represents an angle θ in a vertical direction, and A0 to A8 represent different beams. The base station needs to scan nine beams (A0 to A8) to cover a range of 60 degrees in the horizontal direction and the vertical direction.

Figure 7:
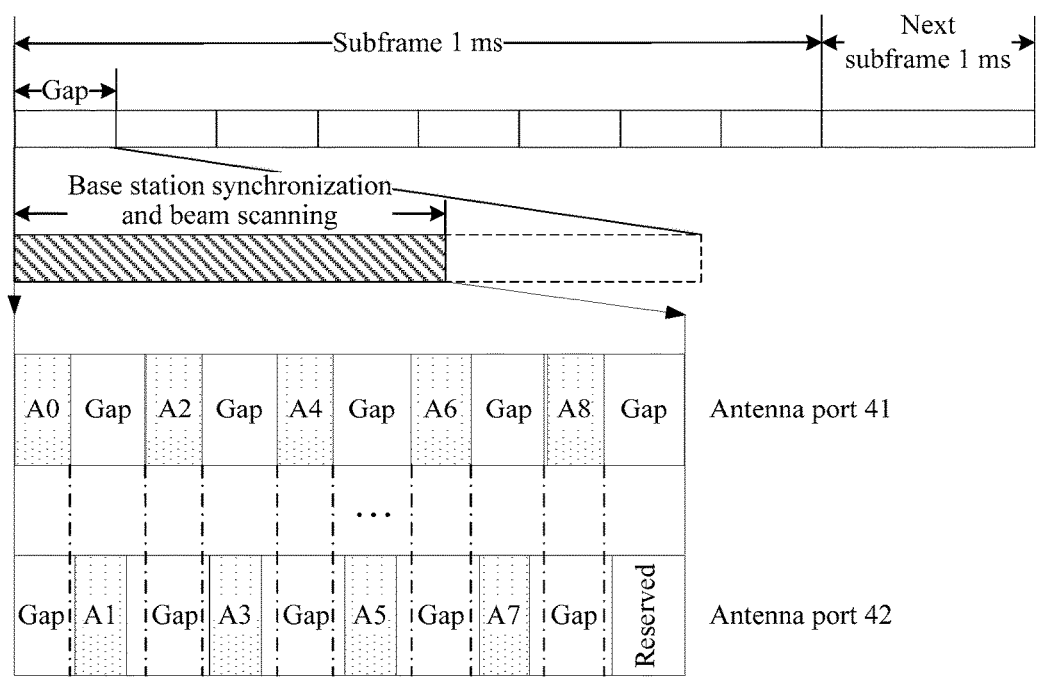
FIG. 7 is a schematic diagram of another example according to an embodiment of this application.

FIG. 7 is a schematic diagram of another example according to an embodiment of this application. As shown in FIG. 7, each of high-frequency subframes (1 ms) in the wireless communications system includes eight gaps (125 us). The base station performs synchronization and beam scanning of the base station at a location in each subframe. For example, in FIG. 7, ▨ represents a location at which the base station performs synchronization and beam scanning, □ represents a communication time of each of beams A0 to A8, and □ represents a switching gap Gap between every two beams. Beams A0, A2, A4, A6, and A8 are sequentially scanned at an antenna port 41. Beams A1, A3, A5, and A7 are sequentially scanned at an antenna port 42. A signal of a beam at the antenna port 42 is transmitted within a switching gap Gap of the antenna port 41, and a signal of a beam at the antenna port 41 is transmitted within a switching gap Gap of the antenna port 42. Beam scanning may be performed at the antenna port 41 and the antenna port 42 with staggered communication times and switching gaps of beam signals. This fully utilizes a switching gap, and improves beam scanning efficiency of the base station by one time. A last gap of the antenna port 42 may be reserved for another purpose, for example, data transmission; or may be used as a guard gap in which no signal is transmitted. A reserved gap described in the following embodiments has a similar function, and details are not described again. It should be understood that the reserved gap is not limited to belonging to the antenna port 42, and another antenna port may also have a reserved gap.

Optionally, the beams A0, A2, A4, A6, and A8 at the antenna port 41 may form a beam set; and the beams A1, A3, A5, and A7 at the antenna port 42 may form another beam set. The beam sets may be identified by using different identifiers IDs. UE may determine, based on a received ID of a beam, a set to which the beam belongs, and further determine a corresponding antenna port or antenna.

Therefore, a beam signal of a beam at the antenna port 41 may be transmitted within a switching gap of the antenna port 42, and a beam signal of a beam at the antenna port 42 may be transmitted within a switching gap of the antenna port 41. This reduces overheads and improves system efficiency.

Optionally, the method 200 may further include: sending or receiving a signal of a fourth beam in a third beam set within the communication time of the first beam in the first beam set; and sending or receiving a signal of a fifth beam in a fourth beam set within the switching gap for switching from the first beam to the second beam in the first beam set.

Specifically, the signal of the fourth beam in the third beam set may be sent or received within the communication time of the first beam in the first beam set. Optionally, a communication time of the fourth beam may be the same as or different from the communication time of the first beam, regardless of whether a communication time of the third beam in the second beam set is the same as a communication time of the fifth beam in the fourth beam set. This may also be implemented. The signal of the third beam in the second beam set and the signal of the fifth beam in the fourth beam set may be sent or received within the switching gap for switching from the first beam to the second beam in the first beam set. Optionally, the communication time of the fifth beam may be the same as or different from the communication time of the third beam, regardless of whether the communication time of the first beam in the first beam set is the same as the communication time of the fourth beam in the third beam set. This may also be implemented. The communication times may be the same or different, provided that the signal of the fifth beam and the signal of the third beam can be transmitted within the switching gap. There is no limitation that the communication time of the fifth beam is completely the same as the communication time of the third beam, or the communication time of the fourth beam is completely the same as the communication time of the first beam. In other words, switching gaps of the first beam set and the third beam set are staggered with and switching gaps of the second beam set and the fourth beam set. To be specific, a signal of a beam in the second beam set and a signal of a beam in the fourth beam set may be sent or received within a switching gap of the first beam set or the third beam set, and a signal of a beam in the first beam set and a signal of a beam in the third beam set may be sent or received within a switching gap of the second beam set or the fourth beam set.

Optionally, the signal of the first beam and the signal of the fourth beam are sent in a frequency division or code division manner; and/or the signal of the third beam and the signal of the fifth beam are sent in the frequency division or code division manner.

Specifically, a beam in the first beam set and a beam in the third beam set are sent simultaneously, and the corresponding beams may be distinguished in the frequency division or code division manner. That is, the signal of the first beam in the first beam set and the signal of the fourth beam in the third beam set are sent in the frequency division or code division manner. In the frequency division manner, different frequencies are selected to send the signals. In the code division manner, different preambles are selected to send the signals. Likewise, this is also applicable to signals of beams corresponding to the second beam set and the fourth beam set.

Optionally, the first beam set, the second beam set, the third beam set, and the fourth beam set are corresponding to different identifier sets.

The base station or the UE may distinguish between or determine different beam sets by using different identifier sets. For example, an identifier is a beam ID.

Optionally, both the first beam set and the third beam set are corresponding to a first identifier set, and both the second beam set and the fourth beam set are corresponding to a second identifier set.

Herein, when both the first beam set and the third beam set are corresponding to the first identifier set, and both the second beam set and the fourth beam set are corresponding to the second identifier set, for example, the base station and the UE determine beams in the first beam set and the third beam set by using a same beam ID. Alternatively, when the first beam set and the second beam set need to be distinguished, determining may also be performed by using a beam ID. Likewise, determining may also be performed by using a beam ID in another possible similar case. Details are not described herein.

Optionally, in an embodiment, the method for transmitting a signal in a wireless communications system in this embodiment of this application may be applied to a base station beam training scenario, specifically including a transmit-end beam training scenario and a receive-end beam training scenario. The following describes the method according to this embodiment of this application with reference to FIG. 8 and FIG. 9. First, the method in this embodiment of this application applied to the transmit-end beam training scenario is described.

Figure 8:
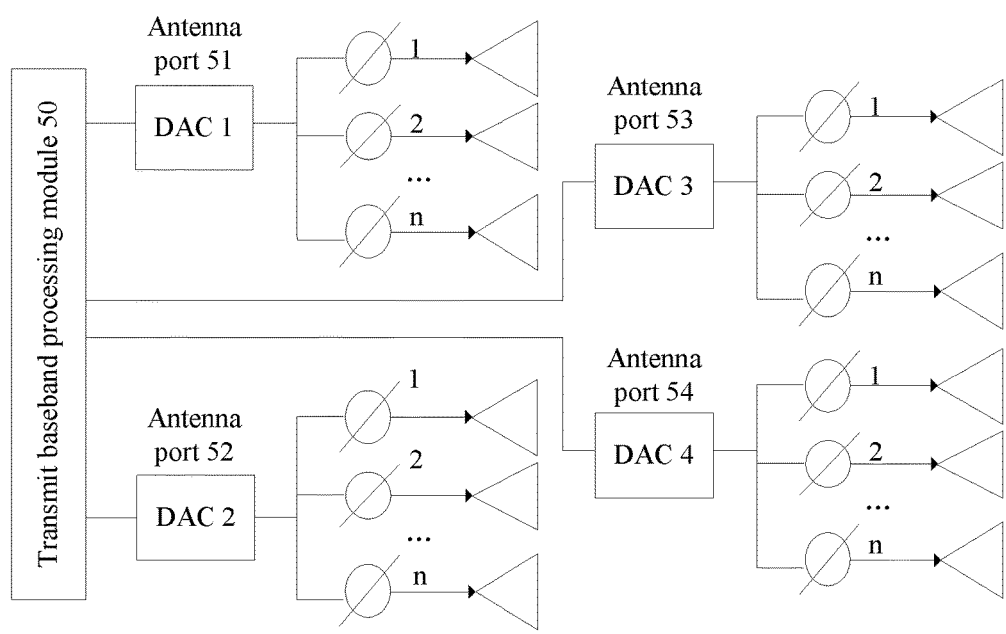
FIG. 8 is a schematic antenna architecture diagram of a transmit end according to an embodiment of this application.

FIG. 8 is a schematic antenna architecture diagram of a transmit end according to an embodiment of this application. As shown in FIG. 8, it is assumed that a transmit baseband processing module 50 includes a DAC 1, a DAC 2, a DAC 3, and a DAC 4, corresponding to an antenna port 51, an antenna port 52, an antenna port 53, and an antenna port 54 respectively. Each antenna port includes n antenna array elements.

Figure 9:
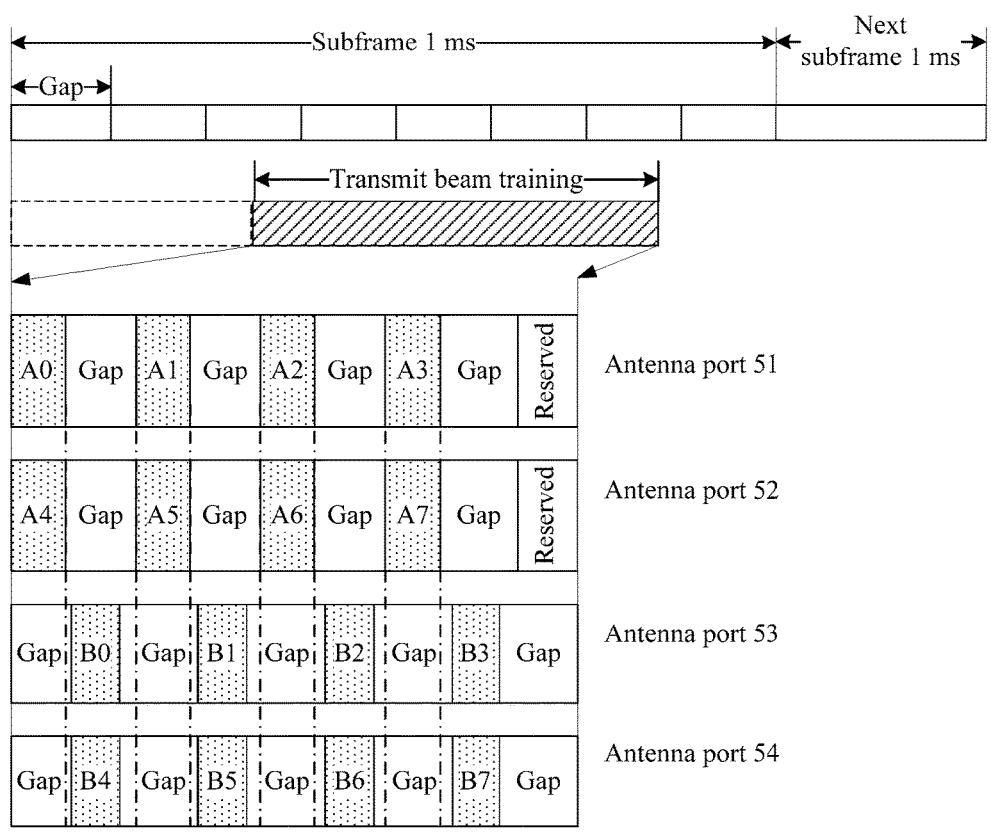
FIG. 9 is a schematic diagram of another example according to an embodiment of this application.

FIG. 9 is a schematic diagram of another example according to an embodiment of this application. As shown in FIG. 9, the base station allocates a segment of gap in a high-frequency subframe for transmit beam training. ▧ represents a location for transmit beam training at the transmit end. In FIG. 9, beams corresponding to the antenna port 51 include A0, A1, A2, and A3; beams corresponding to the antenna port 52 include A4, A5, A6, and A7; beams corresponding to the antenna port 53 include B0, B1, B2, and B3; and beams corresponding to the antenna port 54 include B4, B5, B6, and B7. Similarly, ▨ is used to represent a communication time of a beam, and ☐ is used to represent a switching gap Gap of a beam. Herein, if training is transmit beam training of the base station, the base station sends a beam, and the UE receives the beam; or if training is transmit beam training of the UE, the UE sends a beam, and the base station receives the beam. The antenna port 51 and the antenna port 52 send beams simultaneously, and send beams A0 to A3 and beams A4 to A7 respectively. The antenna port 53 and the antenna port 54 send beams simultaneously, and send beams B0 to B3 and beams B4 to B7 respectively. That is, a communication time of beams at the antenna port 51 is the same as that of the beams at the antenna port 52, and a communication time of beams at the antenna port 53 is the same as that of beams at the antenna port 54. Therefore, the beams B0 and B4 may be sent within a switching gap Gap for switching from the beam A0 to the beam A1 or within a switching gap Gap for switching from the beam A4 to the beam A5, and so on. Therefore, beams at the antenna port 53 and the antenna port 54 are sent within a switching gap of the antenna port 51 or the antenna port 52, to reduce overheads.

Optionally, a beam at the antenna port 51 and a beam at the antenna port 52 are sent simultaneously, and therefore may be distinguished in the frequency division or code division manner. For example, when the frequency division manner is used, the UE detects, by using a preamble 1 at a frequency 1 and a frequency 2 respectively, signals that are transmitted by the antenna port 51 and the antenna port 52 by using different beams, to finally find a transmit beam with best performance, and feeds back the beam to the transmit end. When the code division manner is used, the UE detects, by using both preambles 1 and 2 at a frequency 1, signals that are transmitted by the antenna port 51 and the antenna port 52 by using different beams, to finally find a transmit beam with best performance, and feeds back the beam to the transmit end. Likewise, a beam at the antenna port 53 and a beam at the antenna port 54 may also be distinguished in the frequency division or code division manner.

For antenna ports with staggered communication times for sending beams, such as the antenna port 51 and the antenna port 53, or the antenna port 52 and the antenna port 54, if only these two antenna ports send beams, the beams may be sent by using a same codeword and/or frequency.

Optionally, beam IDs of beams at each of the antenna port 51, the antenna port 52, the antenna port 53, and the antenna port 54 may form a set. Alternatively, beam IDs of beams at the antenna port 51 and the antenna port 52 form a set, for example, the antenna port 51 and the antenna port 52 are corresponding to a first identifier; and IDs of beams at the antenna port 53 and the antenna port 54 form another set, for example, the antenna port 53 and the antenna port 54 are corresponding to a second identifier, where the first identifier is different from the second identifier.

It should be understood that four antenna ports are only used herein as an example for description, and in actual application, there may be more antenna ports. For example, in actual application, there may be eight antenna ports.

Therefore, beams corresponding to the antenna port 53 and the antenna port 54 are sent within beam switching gaps corresponding to the antenna port 51 and the antenna port 52, thereby reducing overheads and improving transmission efficiency of the system.

The foregoing describes the transmit-end beam training scenario with reference to FIG. 8 and FIG. 9. The following describes the receive-end beam training scenario with reference to FIG. 10 and FIG. 11.

Figure 10:
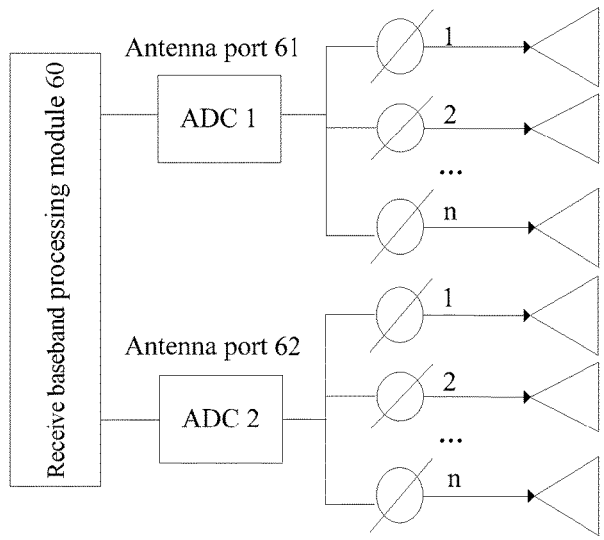
FIG. 10 is a schematic antenna architecture diagram of a receive end according to an embodiment of this application.

FIG. 10 is a schematic antenna architecture diagram of a receive end according to an embodiment of this application. As shown in FIG. 10, it is assumed that a receive baseband processing module 60 includes two analog-to-digital converters (Analog-to-Digital Converter, "ADC" for short): an ADC 1 and an ADC 2, corresponding to an antenna port 61 and an antenna port 62 respectively. Each antenna port includes n antenna array elements.

Figure 11:
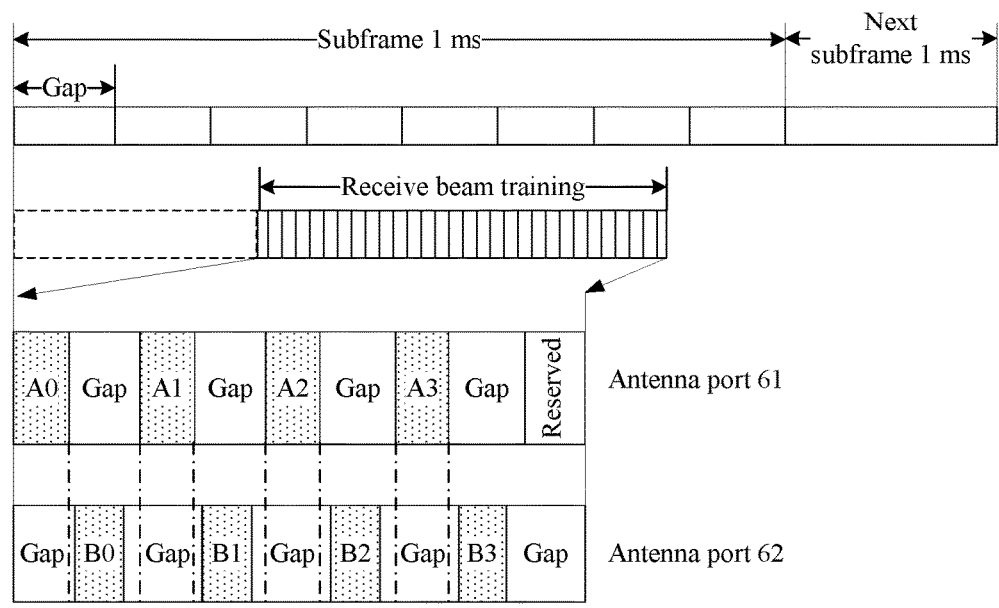
FIG. 11 is a schematic diagram of another example according to an embodiment of this application.

FIG. 11 is a schematic diagram of another example according to an embodiment of this application. As shown in FIG. 11, the base station allocates a segment of gap in a high-frequency subframe for receive beam training. For example, ▨ represents a location for receive beam training at the receive end. In FIG. 11, beams corresponding to the antenna port 61 include A0, A1, A2, and A3; and beams corresponding to the antenna port 62 include B0, B1, B2, and B3. Similarly, ▨ is used to represent a communication time of a beam, and ☐ is used to represent a switching gap Gap of a beam. Herein, if training is transmit beam training of the base station, the base station sends a beam, and the UE receives the beam; or if training is transmit beam training of the UE, the UE sends a beam, and the base station receives the beam. The beams A0, A1, A2, and A3 are sequentially scanned at the antenna port 61. The beams B0, B1, B2, and B3 are sequentially scanned at the antenna port 62. A signal of the antenna port 62 is received within a switching gap of the antenna port 61, and a signal of the antenna port 61 is received within a switching gap of the antenna port 62. This can improve beam scanning efficiency at the receive end by one time, and reduce overheads. A last gap of the antenna port 61 may be reserved for another purpose, for example, data transmission; or may be used as a guard gap in which no data is transmitted.

FIG. 8 and FIG. 10 describe the antenna architecture diagrams of the transmit end and the receive end respectively. In both diagrams, one antenna port is corresponding to one antenna array, that is, one antenna port is corresponding to one antenna.

Optionally, the first beam set and the second beam set may be corresponding to different antenna ports, or corresponding to different antennas of a same antenna port. Specifically, one antenna port may be corresponding to a plurality of antenna arrays, that is, corresponding to a plurality of antennas. In this case, different beam sets may be corresponding to different antennas of a same antenna port. For example, the first beam set and the second beam set are corresponding to different antennas of a same antenna port.

Figure 12:
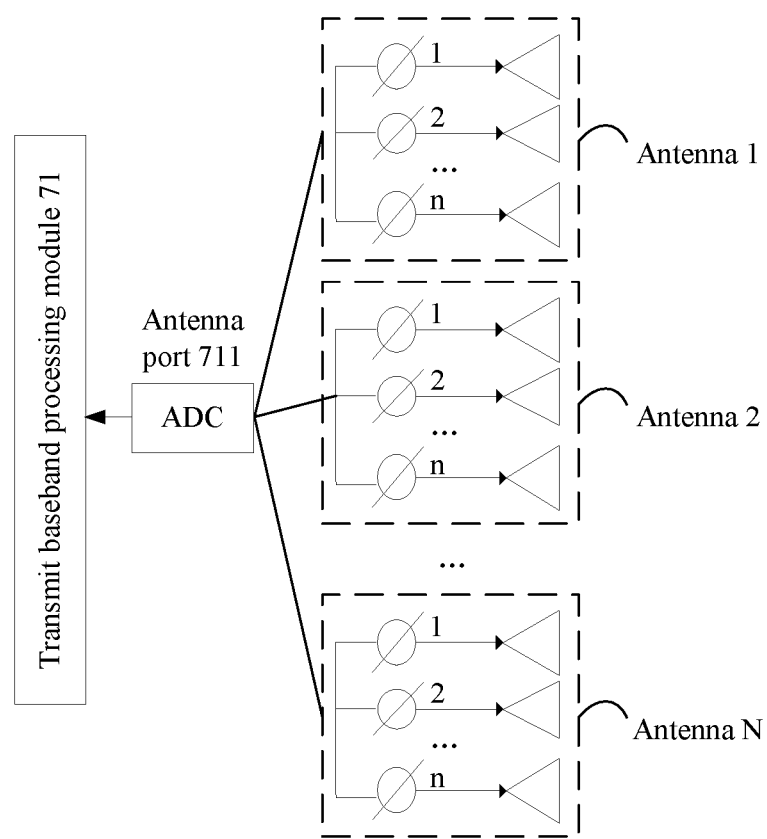
FIG. 12 is another schematic architectural diagram of a transmit end according to an embodiment of this application.
Figure 13:
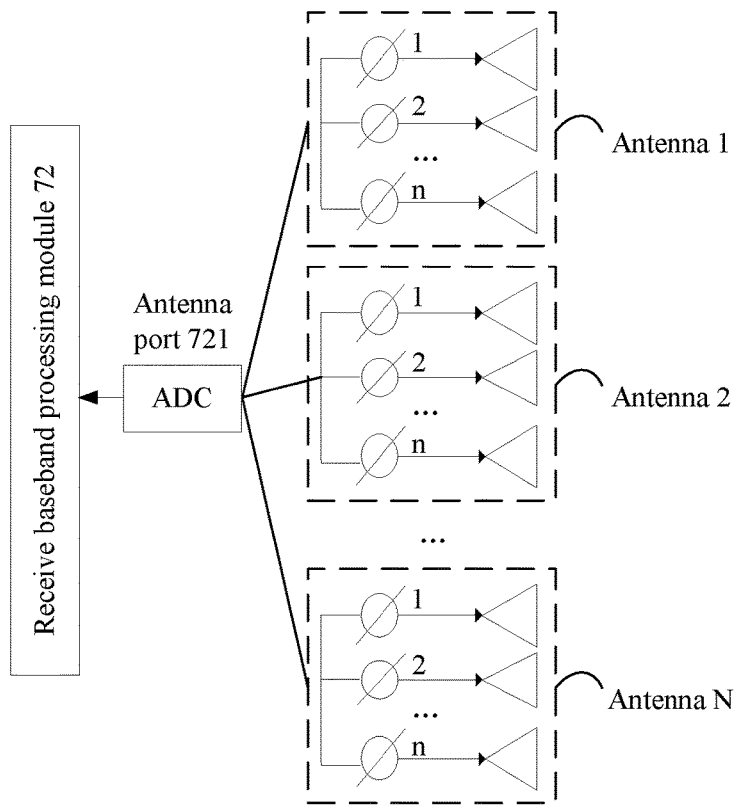
FIG. 13 is another schematic architectural diagram of a receive end according to an embodiment of this application.

The following describes an architectural diagram in which one antenna port is corresponding to a plurality of antenna arrays with reference to FIG. 12 and FIG. 13.

For example, FIG. 12 is another schematic architectural diagram of a transmit end according to an embodiment of this application. As shown in FIG. 12, the transmit end includes a transmit baseband processing module 71, and an antenna port 711 corresponding to a DAC. The antenna port 711 may be corresponding to N antennas. Each antenna is corresponding to n antenna array elements.

FIG. 13 is another schematic architectural diagram of a receive end according to an embodiment of this application. As shown in FIG. 13, the receive end includes a receive baseband processing module 72, and an antenna port 721 corresponding to an ADC. The antenna port 721 may be corresponding to N antennas. Each antenna is corresponding to n antenna arrays.

It should be understood that the method for transmitting a signal in a wireless communications system in this embodiment of this application is also applicable to the foregoing case in which one antenna port is corresponding to a plurality of antennas. For example, an antenna 1 is corresponding to the first beam set, an antenna 2 is corresponding to the second beam set, and the antenna 1 and the antenna 2 send or receive beams within a switching gap of each other. Details are not described herein.

Optionally, in an embodiment, the first beam set and the second beam set are corresponding to different user equipments UEs. In other words, the method for transmitting a signal in a wireless communications system in this embodiment of this application may be further applied to an uplink multi-user beam training scenario, that is, a plurality of users simultaneously send a plurality of beams to the base station, to perform transmit beam training for the users. For example, the plurality of UEs shown in FIG. 1 may send a plurality of beams to the base station. The following describes the method for transmitting a signal in a wireless communications system in this embodiment of this application in this scenario with reference to FIG. 14.

Figure 14:
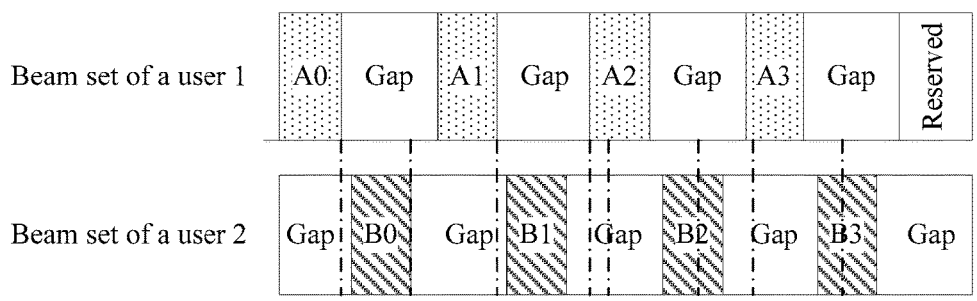
FIG. 14 is a schematic diagram of still another example according to an embodiment of this application.

FIG. 14 is a schematic diagram of still another example according to an embodiment of this application. As shown in FIG. 14, a beam set of a user 1 may include beams A0, A1, A2, and A3, and ▣ is used to represent communication times of the beams A0, A1, A2, and A3; a beam set of a user 2 includes beams B0, B1, B2, and B3, and ▨ is used to represent communication times of the beams B0, B1, B2, and B3; and □ is used to represent a switching gap Gap between every two beams. A last gap of the user 1 may be reserved for another purpose, and has a function similar to that of the aforementioned reserved gap. The base station schedules uplink beam sending moments for the user 1 and the user 2, to ensure that after a signal arrives at the base station, the user 1 and the user 2 can receive the signal within a beam switching gap of each other.

Likewise, optionally, the beam set of the user 1 and the beam set of the user 2 may be corresponding to different identifier sets, so that the base station distinguishes between different beam sets or beams. For example, the beam set of the user 1 is corresponding to a first identifier, and the base station determines, based on the first identifier, that the beam set belongs to the user 1, and then determines different beams in the beam set based on a time sequence. Alternatively, for example, the beams of the user 1 are corresponding to a same identifier, and the base station determines, based on the identifier, the user corresponding to the beam set or the beams.

It should be understood that this embodiment of this application may include a case in which a plurality of users simultaneously send beams to the base station. In FIG. 14, the user 1 and the user 2 are used as examples for description, but should not constitute a limitation on this embodiment of this application.

Therefore, for a plurality of beam sets corresponding to a plurality of users, a signal of a beam in a beam set may be sent or received within a switching gap of a beam in another beam set. The method for transmitting a signal in a wireless communications system in this embodiment of this application is also applicable to this case.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

The foregoing describes in detail the method according to this embodiment of this application, including application of the method in different scenarios. The following describes an apparatus according to an embodiment of this application.

It should be understood that the apparatus in this embodiment of this application may be a base station or user equipment in a high-frequency wireless communications system, or a communications device supporting a high-frequency wireless communications system, for example, may be the base station 20 or any wireless terminal among the UE 10 to the UE 17 in FIG. 1.

Figure 15:
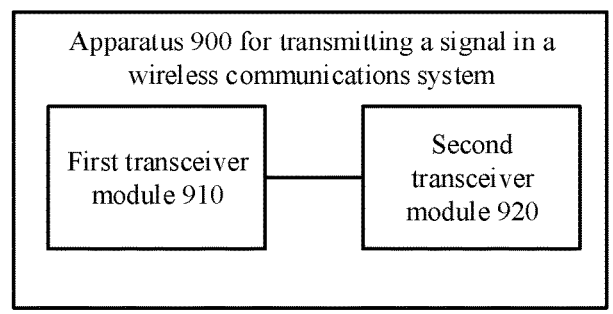
FIG. 15 is a schematic block diagram of an apparatus for transmitting a signal in a wireless communications system according to an embodiment of this application.

FIG. 15 is a schematic block diagram of an apparatus for transmitting a signal in a wireless communications system according to an embodiment of this application. As shown in FIG. 15, the apparatus 900 includes:

a first transmission module 910, configured to send or receive a signal of a first beam in a first beam set within a communication time of the first beam; and a second transmission module 920, configured to send or receive a signal of a third beam in a second beam set within a switching gap for switching from the first beam of the first transmission module 910 to a second beam in the first beam set.

According to the apparatus for transmitting a signal in a wireless communications system in this embodiment of this application, the signal of the third beam in the second beam set is sent or received within the switching gap for switching from the first beam to the second beam in the first beam set, to reduce overheads.

A transmission module in this embodiment of this application may include a receive module or a transmit module, respectively configured to receive or send a signal. For example, the first transmission module may include a transmitter and a receiver. The transmitter and the receiver may be integrated, or may be separated independent modules. The transmitter is configured to send a signal, and the receiver is configured to receive a signal. This is also applicable to the second transmission module.

Optionally, in an embodiment, the first transmission module 910 is further configured to:

send or receive a signal of a fourth beam in a third beam set within the communication time of the first beam; and the second transmission module 920 is further configured to:

send or receive a signal of a fifth beam in a fourth beam set within the switching gap for switching from the first beam to the second beam.

Optionally, a communication time of the fourth beam is the same as the communication time of the first beam.

Optionally, a communication time of the fifth beam is the same as a communication time of the third beam.

Optionally, in an embodiment, the signal of the first beam and the signal of the fourth beam are sent in a frequency division or code division manner; and/or the signal of the third beam and the signal of the fifth beam are sent in the frequency division or code division manner.

Optionally, in an embodiment, the first beam set and the second beam set are corresponding to different antenna ports, or corresponding to different antennas of a same antenna port.

Optionally, in an embodiment, the first beam set and the second beam set are corresponding to different user equipments UEs.

Optionally, in an embodiment, the first beam set and the second beam set are corresponding to different identifier sets.

Optionally, in an embodiment, both the first beam set and the third beam set are corresponding to a first identifier set, and both the second beam set and the fourth beam set are corresponding to a second identifier set.

Therefore, according to the apparatus for transmitting a signal in a wireless communications system in this embodiment of this application, the signal of the third beam in the second beam set is sent or received within the switching gap for switching from the first beam to the second beam in the first beam set, to reduce overheads.

The apparatus 900 according to this embodiment of this application may be an execution body of the method 200 according to the embodiment of this application, and the foregoing and other operations and/or functions of the modules in the apparatus 900 are used to separately implement corresponding procedures of the foregoing methods. For brevity, details are not described herein.

Figure 16:
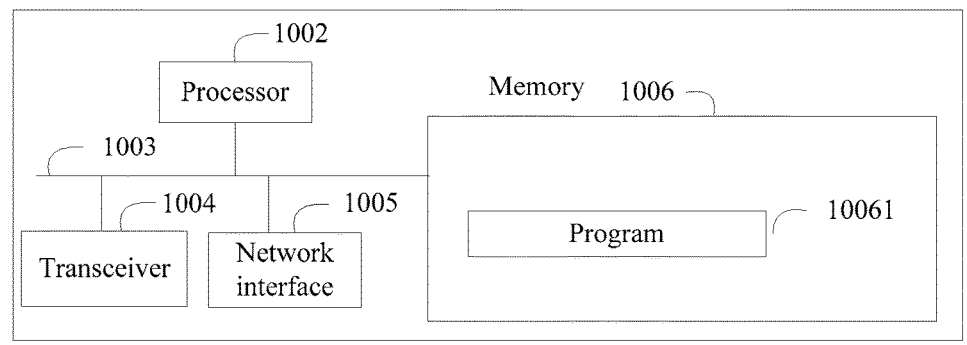
FIG. 16 is a structural diagram of an apparatus for transmitting a signal in a wireless communications system according to another embodiment of this application.

FIG. 16 shows a structure of an apparatus for transmitting a signal in a wireless communications system according to another embodiment of this application. The apparatus may be included in the baseband processing module corresponding to FIG. 5, or in the aforementioned receive end or transmit end. The apparatus includes at least one processor 1002 (for example, a CPU), at least one network interface 1005 or another communications interface, a memory 1006, at least one communications bus 1003 configured to implement a connection and communication between these apparatuses, and a transceiver 1004 configured to send or receive a signal. The processor 1002 is configured to execute an executable module, such as a computer program, that is stored in the memory 1006. The memory 1006 may include a high-speed random access memory (RAM: Random Access Memory), or may include a non-volatile memory (non-volatile memory), for example, at least one magnetic disk storage. The at least one network interface 1005 (wired or wireless) is used to implement a communications connection to at least one another network element. The transceiver 1004 is configured to send or receive a signal. The transceiver 1004 is configured to: send or receive a signal of a first beam in a first beam set within a communication time of the first beam; and send or receive a signal of a third beam in a second beam set within a switching gap for switching from the first beam to a second beam in the first beam set. In some implementations, the memory 1006 stores a program 10061, and the processor 1002 executes the program 10061, to control the transceiver 1004 to perform the method for transmitting a signal in a wireless communications system in the foregoing embodiments of this application.

It should be understood that, in this embodiment of this application, the processor 1002 may be a central processing unit (Central Processing Unit, "CPU" for short), or the processor 1002 may be another general purpose processor, a digital signal processor (DSP), an application-specific integrated circuit (ASIC), a field programmable gate array (FPGA) or another programmable logic device, a discrete gate or transistor logic device, a discrete hardware component, or the like. The general purpose processor may be a microprocessor, or the processor may be any conventional processor or the like.

The memory 1006 may include a read-only memory and a random access memory, and provide an instruction and data for the processor 1002. A part of the memory 1006 may further include a non-volatile random access memory. For example, the memory 1002 may further store information about a device type.

The communications bus 1003 may further include a power bus, a control bus, a status signal bus, and the like, in addition to a data bus. However, for clarity of description, various types of buses in the figure are marked as the bus system 1003.

In an implementation process, steps in the foregoing method may be implemented by using a hardware integrated logic circuit in the processor 1006, or by using instructions in a form of software. The steps of the method disclosed with reference to the embodiments of this application may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, or a register. The storage medium is located in the memory 1006, and the processor 1002 reads information in the memory 1006 and performs the steps in the foregoing method in combination with hardware of the processor. To avoid repetition, details are not described herein again.

Optionally, the transceiver 1004 may include a transmitter and a receiver. The transmitter and the receiver may be integrated, or may be separated independent modules. The transmitter is configured to send a signal, and the receiver is configured to receive a signal. Optionally, in this embodiment of this application, the transmitter may be configured to send a signal of a beam, and the receiver may be configured to receive a signal of a beam. According to the apparatus for transmitting a signal in a wireless communications system in this embodiment of this application, the signal of the third beam in the second beam set is sent or received within the switching gap for switching from the first beam to the second beam in the first beam set, to reduce overheads.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

A person of ordinary skill in the art may be aware that, with reference to the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for convenience and brevity of description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the shown or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separated, and parts shown as units may or may not be physical units, may be located in one position, or may be distributed on a plurality of network units. Some or all of the units may be selected depending on actual requirements to achieve the objectives of the solutions of the embodiments.

In addition, function units in the embodiments of this application may be integrated into one processing unit, or each of the units may exist alone physically, or two or more units may be integrated into one unit.

When the functions are implemented in a form of a software function unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The storage medium includes any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for transmitting a signal in a wireless communications system, comprising:
    transmitting a signal of a first beam in a first beam set within a communication time of the first beam, wherein the first beam set includes the first beam and a second beam;
    transmitting a second signal of the second beam within a communication time of the second beam, wherein there is at least a switching gap between the communication times of the first beam and the second beam, the switching gap occurring during a transmission switching from the first beam to the second beam; and
    transmitting a signal of a third beam in a second beam set within the switching gap.

2. The method according to claim 1, wherein the method further comprises:
    transmitting a signal of a fourth beam in a third beam set within the communication time of the first beam; and
    transmitting a signal of a fifth beam in a fourth beam set within the switching gap for switching from the first beam to the second beam.

3. The method according to claim 2, wherein the signal of the first beam and the signal of the fourth beam are sent in a frequency division or code division manner; and/or the signal of the third beam and the signal of the fifth beam are sent in the frequency division or code division manner.

4. The method according to claim 1, wherein the first beam set and the second beam set correspond to different antenna ports, or correspond to different antennas of a same antenna port.

5. The method according to claim 1, wherein the first beam set and the second beam set correspond to different user equipments (UEs).

6. The method according to claim 1, wherein the first beam set and the second beam set correspond to different identifier sets.

7. The method according to claim 2, wherein both the first beam set and the third beam set correspond to a first identifier set, and both the second beam set and the fourth beam set correspond to a second identifier set.

8. An apparatus for transmitting a signal in a wireless communications system, comprising:
    a first transceiver, configured to transmit a signal of a first beam in a first beam set within a communication time of the first beam, wherein the first beam set includes the first beam and a second beam;
    transmit a second signal of the second beam within a communication time of the second beam, wherein there is at least a switching gap between the communication times of the first beam and the second beam, the switching gap occurring during a transmission switching from the first beam to the second beam; and
    a second transceiver, configured to transmit a signal of a third beam in a second beam set within the switching gap.

9. The apparatus according to claim 8, wherein the first transceiver is further configured to:
    transmit a signal of a fourth beam in a third beam set within the communication time of the first beam; and
    the second transceiver is further configured to:
    transmit a signal of a fifth beam in a fourth beam set within the switching gap for switching from the first beam to the second beam.

10. The apparatus according to claim 9, wherein the signal of the first beam and the signal of the fourth beam are sent in a frequency division or code division manner; and/or the signal of the third beam and the signal of the fifth beam are sent in the frequency division or code division manner.

11. The apparatus according to claim 8, wherein the first beam set and the second beam set correspond to different antenna ports, or correspond to different antennas of a same antenna port.

12. The apparatus according to claim 8, wherein the first beam set and the second beam set correspond to different user equipments (UEs).

13. The apparatus according to claim 8, wherein the first beam set and the second beam set correspond to different identifier sets.

14. The apparatus according to claim 9, wherein both the first beam set and the third beam set correspond to a first identifier set, and both the second beam set and the fourth beam set correspond to a second identifier set.

* * * * *